Dec. 21, 1943.   R. C. TOWNSEND   2,337,073
SPRING MOUNTING
Filed July 21, 1941

Inventor
ROY C. TOWNSEND
Carlsen + Hagle
Attorneys

Patented Dec. 21, 1943

2,337,073

UNITED STATES PATENT OFFICE 2,337,073

SPRING MOUNTING

Roy C. Townsend, La Crosse, Wis.

Application July 21, 1941, Serial No. 403,444

8 Claims. (Cl. 267—56)

This invention relates to improvements in mounting means for the ends of the leaf springs used in the suspension of vehicle wheels.

The primary object of the invention is to provide a spring mounting means which will permit the usually troublesome shackles to be entirely dispensed with and will permit free play of the spring ends as the spring flexes in the normal manner. Another object is to provide a device of this nature in which provision is made for the convenient and inexpensive replacement of all parts subject to wear, and means for adequately lubricating all working parts to reduce the wear thereon. A further object is to provide a device of this kind which is simple, rugged and inexpensive and capable of being readily applied to the vehicle. Still a further object is to provide a spring mounting assembly particularly useful for heavy duty vehicles such as trailers and which so locates the springs that the maximum stability is secured.

These and other more detailed and specific objects will be disclosed in the course of the following specification, reference being had to the accompanying drawing, in which—

Figure 1:
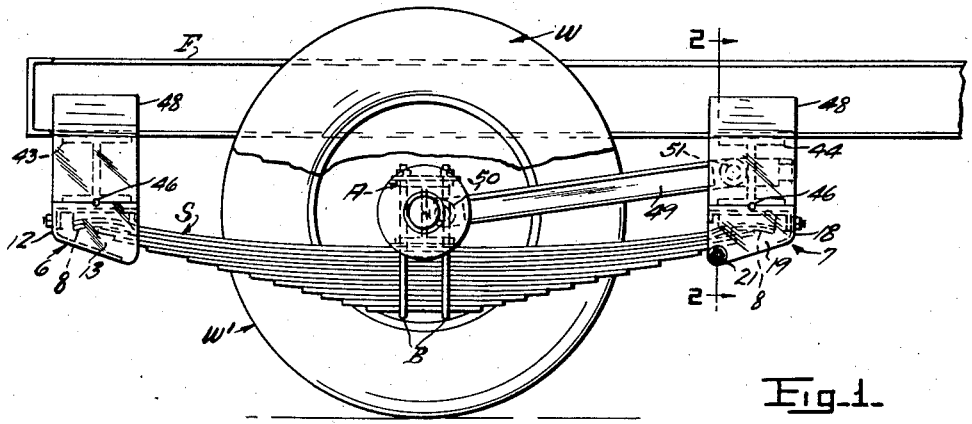
Fig. 1 is a side elevation of a vehicle frame and wheel assembly in which the springs are equipped with my invention, the rear wheel being largely broken away to better illustrate the construction.
Figure 2:
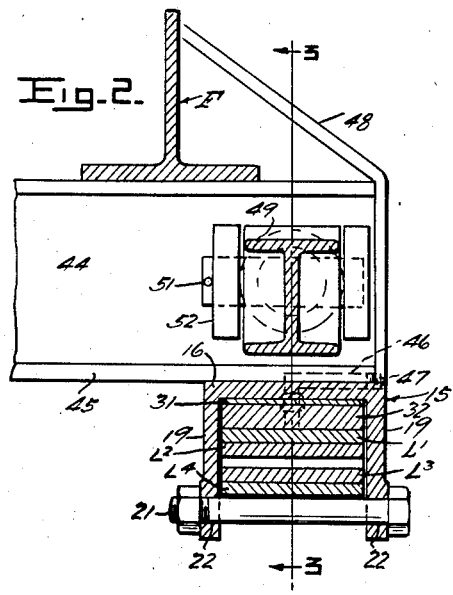
Fig. 2 is an enlarged vertical cross section along the line 2—2 in Fig. 1 showing the rear end spring mounting and associated parts.
Figure 3:
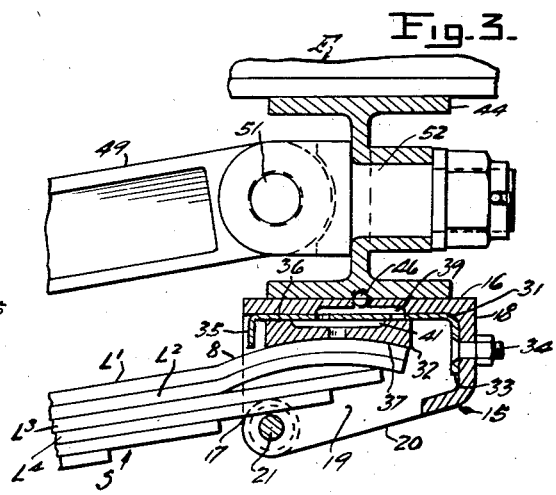
Fig. 3 is a vertical and longitudinal section taken along the line 3—3 in Fig. 2.
Figure 4:
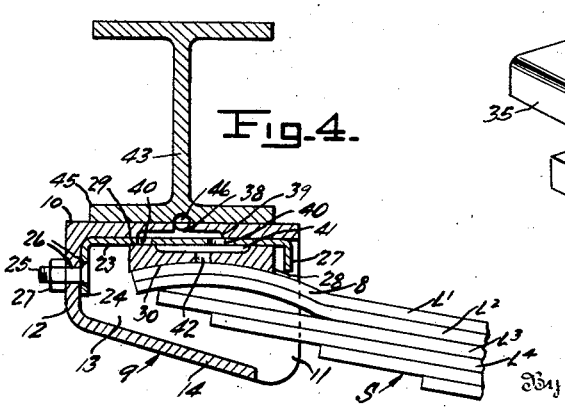
Fig. 4 is a similar view but showing the front end spring mounting.
Figure 5:
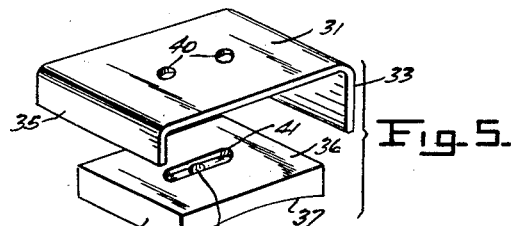
Fig. 5 is a perspective view of the wear plate and pad member used in connection with my spring mounting.

My invention is shown in the drawing as used for supporting an end of a trailer frame upon transversely spaced and axially aligned wheels but it is to be understood that the mounting means herein disclosed may be used as well in connection with other vehicles or wherever leaf springs are employed in vehicle suspension.

Referring now more particularly and by reference characters to the drawing the trailer is seen to comprise main longitudinal frame beams F which are rigidly braced and cross connected in usual fashion and the frame is adapted to be supported upon the transversely spaced and axially aligned ground wheels W—W'. For supporting the frame semi-elliptical, multi-leaf springs are employed and are located adjacent each wheel, one spring being here shown and designated generally at S. The axle A connecting the wheels W—W', and carrying the spindles therefor, is supported as here shown above the center portion of the springs and is connected rigidly thereto in a conventional manner by U-bolts B. It is to be understood, however, that the axle may be located beneath the springs if so desired.

In the usual spring assembly of this kind the front and rear ends of the springs S are connected to the vehicle by means of shackles which permit the necessary play caused by the flexing of the spring as they they absorb the shocks incident to travel of the wheels over the ground.

Such shackles are relatively inexpensive and troublesome and in accordance with my invention I dispense with them entirely and provide the novel mounting means now to be described.

Inasmuch as the mountings for each spring S are duplicates, only one complete spring and mounting mechanism will be herein described. The front and rear mountings or mounting units, designated generally at 6 and 7 respectively, differ slightly however and will accordingly be separately treated.

At the outset it will be noted that the spring S is conventional insofar as the front and rear ends bow upwardly and the individual leaves increase in length by steps from bottom to top to provide adequate strength and flexibility. The two uppermost leaves $L^1$—$L^2$ are however of substantially the same length and at their outer end portions are arcuately formed to provide upwardly rounded or convexed (when viewed from the side) ends or extensions as designated at 8. The next adjacent lower leaves $L^3$ and $L^4$, while shorter, are so extended and arranged that they upwardly and yieldably brace these ends 8.

The forward mounting unit 6 comprises a housing, socket or pocket member 9 which is adapted to be rigidly mounted by its closed upper side 10 on the vehicle in such position that the forward ends of the spring leaves $L^1$ through $L^4$ may enter loosely through the open inner or rear end 11 but will terminate short of the closed outer or forward end 12. The sides 13 of this housing or body member 9 prevent lateral displacement of the spring while the closed lower side or bottom 14 prevents downward displacement should the vehicle frame be lifted. Preferably the sides 13 increase in vertical width in the rearward direction to give the housing a tapered shape to best accommodate and correspond to the upward curvature of the spring.

The rear mounting unit 7 comprises a similarly constructed housing, pocket or body member 15 mounted by its closed upper side 16 on the vehicle but oppositely faced to receive the rear ends of the spring leaves, L¹ through L⁴, through its open inner or forward end 17. The rear or outer end 18 is closed and sides 19 are provided but here the underside or body is open as at 20 except immediately adjacent the rear end. This permits the spring to be mounted, when the units 6 and 7 are properly spaced, by inserting the forward end into unit 6 in an upward and forward direction and then the rear end may be placed up through the open bottom 20 without difficulty. Downward displacement of the rear end of the spring is then prevented by insertion of a cross or retaining bolt 21 through openings 22 formed in the forward, lower corners of the sides 19 beneath the spring.

When properly mounted the housings 9 and 15 freely receive the spring ends and the closed ends 12 and 18 clear the spring ends sufficiently to allow the necessary forward and rearward movement or expansion as the spring flexes.

Mounted within the forward housing 9 is a wear plate 23 of such shape and size as to fit the under surface of the closed top 10 and having a forward end 24 turned downwardly to fit the adjacent inner surface of the housing end 12. A bolt 25 is passed through openings 26 in these ends 24 and 12 and by means of a nut 26 the ends are clamped together to thus rigidly mount the wear plate within the housing. The opposite or rear end of the wear plate is turned downwardly to form a retaining lip 27 which clears the spring S some distance. A wear pad, block or shoe 28 is also provided and has a flat, smooth upper bearing surface 29 adapted to slidably engage the underside of the wear plate 23. This pad is shorter in a fore and aft direction, than the wear plate in order to permit free sliding movement within the limits of the space between the downturned ends 24 and 27. The underside 30 of the pad 28 is concaved or arcuately recessed to nicely fit the arcuate end portion 8 of the spring leaves L¹ and L².

An identical wear plate 31 and pad or shoe member 32 are provided within the rear housing 15, said plate having an inner and rear end 33 mounted by a bolt 34 and a forward downwardly turned retaining lip 35. The pad 32 has a flat upper bearing surface 36 to slidably engage the underside of the wear plate and a concaved lower surface 37 to fit the arcuate rear ends 8 of the spring leaves L¹—L².

In the operation of the structure thus far described in will be apparent that the weight of that part of the vehicle carried by the wheels W—W' will be supported through the housings 9—15, wear plates 23—31 and pads 28—32 upon the arcuated ends 8 of the spring. As the wheels then move upwardly or downwardly during travel over irregular surfaces the resulting longitudinal movements or expansion and contraction of the spring S will be permitted by back and forth movements of the pads 28—32 beneath the wear plates 23—31, such movement being facilitated by the flat and smooth contacting surfaces of these parts. The arcuate ends 8 of the springs may rock or pivot slightly in the concaved lower sides of the pads 28—32 to compensate for the slight vertical rocking or "walking beam" motion of the spring and this without in any way reducing the effective weight supporting and bearing surface between spring ends and pads. Obviously the only wear occurs between the wear plates and pads and, since both are small, simple and inexpensive, their replacement when required is an easy matter.

To reduce such wear and to enchance the smoothness of operation I provide lubricating means for the parts as will now be described. The housings 9—15 each have a centrally located opening 38 through the upper sides 10—16 and each opening enters at its lower end a longitudinally elongated groove 39 in the underside of the said closed sides 10—16. Each wear plate 23—31 then has a pair of centrally located and longitudinally spaced ports 40 which register with the respective ends of the grooves 39. The pads 28—32 have longitudinally extending grooves 41 in their upper bearing surfaces 29 and 36 and centrally located openings 42 which open through the rounded lower surfaces 30—37. Obviously by forcing grease or oil into the openings 38 it will flow between the wearing surfaces of the wear plates and pads and between the pads and spring ends 8 to lubricate same and reduce the wear. The spacing and elongation of the grooves is such that adequate lubrication will be provided in any position of the pads.

In the particular installation here shown the trailer frame beams F, by the nature of their use, are relatively closely spaced and to widen the spring centers I provide cross beams 43 and 44 which extend outwardly at their ends beyond the sides of the beams F and are spaced apart longitudinally to accommodate the spring mounting units 6 and 7. The housings 9 and 15 of these units are accordingly secured, as by welding to the lower flanges 45 of the cross beams 43—44 at the outer ends thereof to thus widen the spacing between spring centers and increase stability.

To conduct the lubricating material to the openings 38 transverse, outwardly opening bores 46 are formed at the junction of the housings 9—15 and flanges 45 and such bores may be tapped as at 47 to receive any conventional grease fitting (not shown).

Side plates 48 are welded to the outer ends of the cross beams 43—44 and to the sides of the beams F to blend with outer sides of the housings 9—15 and enhance the appearance of the entire installation.

Thrust rods 49 are pivotally connected at 50 to the wheel axle A and extend rearwardly immediately over the springs S to the rear cross beam 44 where they are pivoted at 51 to apertured members 52 secured in said cross beam. Obviously when the wheel axle A is arranged beneath the springs the rear ends of the thrust rods might be mounted beneath the units 6 and 7 by suitable brackets (not here shown).

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle suspension assembly including a leaf spring and a wheel supporting the spring at one point, means for supporting the vehicle on the spring, comprising a shoe member slidably mounted and supportably connected with the vehicle, the said shoe member having a concaved lower side, and the said spring having at least one upper leaf upwardly rounded to pivotally engage said concaved lower side of the shoe member and to restrain the spring and shoe member against relative endwise movements.

2. The combination in a vehicle suspension assembly including a leaf spring, of means for supportably connecting the vehicle to the spring, comprising a pad member arranged for sliding movement in a line parallel with the length of the spring, means supportably connecting the pad member and vehicle, the underside of the pad member having a rounded surface, and the end of the spring being upwardly arched to fit said rounded surface and bear upwardly thereagainst, said rounded surface and arched spring end permitting rocking movements of the spring with respect to the pad and in an upright plane.

3. In a vehicle suspension assembly including a leaf spring wheel supported at one point and adapted at one end to yieldably and upwardly support the vehicle, a wear plate, means securing said wear plate to the vehicle, a pad member slidably and upwardly engaging said wear plate for endwise movement thereon in a direction substantially parallel with the longitudinal axis of the spring, said pad having an under surface concaved and upwardly rounded, and the said spring having an end portion upwardly rounded to supportably and oscillatably fit said concaved under surface of the pad member.

4. In a vehicle suspension assembly including a leaf spring, mounting means for the ends of the spring comprising body members secured to the vehicle, wear plates mounted in said body members, pads upwardly engaging the wear plates and slidable therebeneath, the ends of the spring being inserted into said body members and bearing upwardly against the undersides of said pads, and the contacting surfaces of the springs and pads being arcuately formed and rounded to permit upward and downward oscillating movements of the spring relative to the pads.

5. In a vehicle suspension assembly including a semi-elliptical leaf spring, mounting means for the ends of the spring comprising body members secured to the vehicle, wear plates mounted in said body members, pads upwardly engaging the wear plates and slidable in an endwise direction therebeneath, the ends of the spring being inserted into said body members and bearing upwardly against the undersides of said pads, and the contacting surfaces of the springs and pads being arcuately formed and rounded in a direction longitudinally extending with respect to the spring and vehicle to permit upward and downward oscillating movements of the spring relative to the pads, the said body members having side portions to prevent lateral displacement of the pads and spring ends.

6. In a spring suspension mechanism for a vehicle including a leaf spring adapted to yieldably and upwardly support the vehicle, a mounting and connecting means for an end of said spring comprising a pocket member secured to the vehicle and having an open end to loosely receive the spring end and sides to prevent lateral displacement thereof, a wear plate secured in said pocket member, a shoe arranged below the wear plate and bearing upwardly thereagainst for movement in a longitudinal direction parallel with the length of the spring, the said spring end being arranged to bear upwardly against the underside of the shoe, and the said wear plate having end portions turned downwardly to limit longitudinal movements of the shoe.

7. In a vehicle suspension assembly including a leaf spring, means for making connection between the end of the spring and the vehicle, comprising a body member secured to the vehicle and loosely receiving the end of the spring, a wear plate secured in the body member, a pad slidably and upwardly bearing against the underside of the wear plate, the said spring end being arranged to bear upwardly against the underside of the pad, and the said body member, wear plate and pad having openings to conduct a lubricant to the bearing surfaces between the pad and the wear plate and spring end, the said pad having also a groove to receive lubricant from the openings in the wear plate in any relative position of the pad with respect to the wear plate.

8. In a vehicle suspension assembly including a leaf spring, means for supportably connecting an end of the spring to the vehicle, comprising a shoe member slidably mounted for endwise movements in the direction of the length of the spring and supportably connected with the vehicle, the said shoe member having an upwardly concaved lower side, and the said spring having an upwardly convexed portion engaging the concaved lower side of the shoe member to maintain a long bearing surface therewith and to permit relative rocking movements between spring and shoe member while preventing sliding movements of the shoe member relative to the spring.

ROY C. TOWNSEND.